United States Patent
Moeller

[11] 3,859,945
[45] Jan. 14, 1975

[54] MARINE BAILER PLUG
[75] Inventor: Axel Moeller, St. Petersburg Beach, Fla.
[73] Assignee: Moeller Manufacturing Co., Inc., Greenville, Miss.
[22] Filed: June 29, 1973
[21] Appl. No.: 375,128

[52] U.S. Cl. .................................. 114/197, 215/53
[51] Int. Cl. ........................................... B63b 13/02
[58] Field of Search ........... 114/183, 184, 185, 197, 114/198; 220/24 S; 215/53, 34

[56] References Cited
UNITED STATES PATENTS

| | | | |
|---|---|---|---|
| 2,245,887 | 6/1941 | Wikander | 220/24 S |
| 2,292,149 | 4/1942 | Moeller | 215/53 |
| 2,315,538 | 4/1943 | Moeller | 215/53 |
| 2,978,138 | 4/1961 | Moeller | 114/197 |
| 2,997,975 | 8/1961 | Moeller | 114/183 |
| 3,550,636 | 12/1970 | Hearne | 220/24 S |

Primary Examiner—Trygve M. Blix
Assistant Examiner—Galen L. Barefoot
Attorney, Agent, or Firm—Berman, Bishoff & Platt

[57] ABSTRACT

A bailer plug is disclosed including a resilient compressible plug body having resilient sealing ribs in which the grooves between the ribs are of reduced height so as to provide quicker purchase on the interior of the thimble in which the plug is inserted. A threaded stem is provided with an integral head on one end having an outwardly flaring annular portion including a pair of oppositely extending detents which engage in oppositely disposed slots in the base of the plug body. The threaded stem extends through an axial bore in the plug body and has a metal disc engaged thereover having a diameter such as to engage the inner face of the thimble. A nut is threaded onto the threaded stem and the threaded stem is upset at its terminal end beyond the nut to prevent the nut from detaching therefrom. A tubular shaft extends outwardly from the nut completely encompassing the end of the threaded shaft. A T-bar handle pierces the tubular shaft at its outer end to provide means for tightening and loosening the nut on the threaded shaft. The tightening of the nut on the threaded stem draws the head of the threaded stem and the circular plate toward each other so as to compress the plug body into tight sealing engagement with the threaded stem and with the thimble in the transom of the boat so as to seal the bailer thimble hole and the bore in the plug body completely against water passing therethrough.

6 Claims, 6 Drawing Figures

PATENTED JAN 14 1975
3,859,945
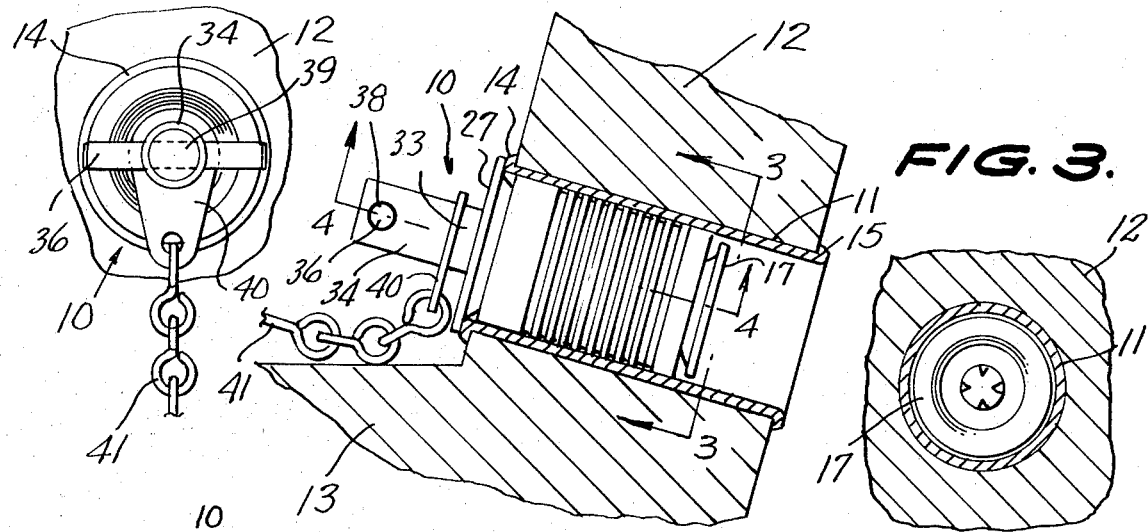
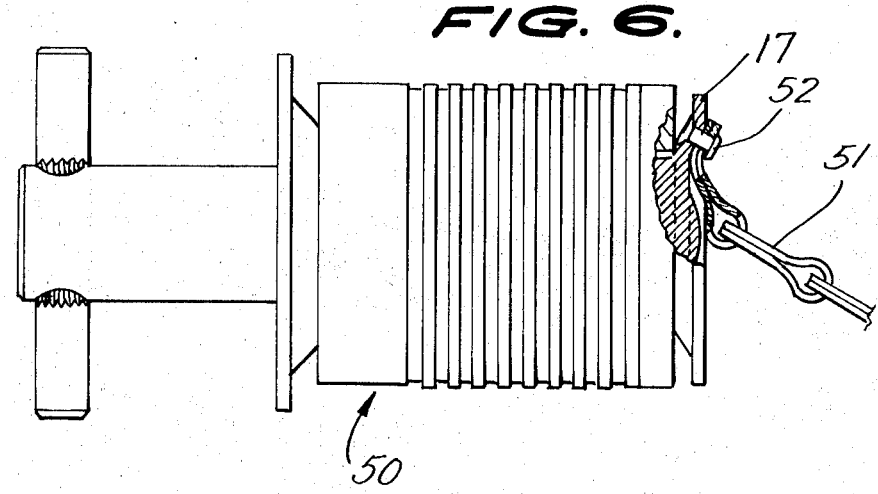

MARINE BAILER PLUG

BACKGROUND OF THE INVENTION

1. Field of the Invention

This invention pertains to improved removable marine bailer plugs for the drain openings in small boats.

2. The Prior Art

In the prior art marine bailer plugs which fit into a metallic thimble in the transom of a boat to seal the opening through the transom, there has been a serious deficiency which has caused such plugs to be often ineffective. It has been found that the users of such plugs are inclined to over-tighten the plug, i.e., to tighten the compression plates and cause overexpansion of the plug body, beyond the point at which the plug is firmly fitted within the thimble. As a result, it has been found that the ends of the plug flow over the compression plates and away from the thimble, thereby reducing the contact between the plug and thimble and rendering the seal ineffective.

SUMMARY OF THE INVENTION

Accordingly, it is a primary object of the present invention to provide a marine bailer plug in which the aforesaid disadvantages of the prior art plugs with respect to overturning are eliminated.

A further object of the present invention is to provide a marine bailer plug in which a more effective seal is achieved between the plug body and the thimble as well as through the internal axial bore through the plug body.

Still a further object of the present invention is to provide a marine bailer plug having a unique head integrally formed with the stem which serves as a lower compression plate as well as effectively blocking flow of water through the plug body, thus eliminating the need for the O-ring found in the prior art marine bailer plugs.

Still another object of the present invention is to provide a marine bailer plug wherein the stem has integrally formed therewith means for preventing rotation of the plug body with respect to the stem.

These objects are realized in the present invention through the provision of a stem passing through the axial bore of the plug body, having a head with an outwardly flaring annular portion which terminates in a flat disk-like portion. The end of the plug body adjacent the head engages the inner end of the flared portion so that the initial compression of the body will cause the plug material to bulge radially outwardly adjacent the head to produce a seal against the interior of the thimble. The pressure of the plug body against the head also seals the bore against the flow of water therethrough and eliminates the necessity for the prior art O-ring. The compression plate at the other end of the stem has an outer flat annular portion which provides metal to metal contact with the flange of the thimble and thus prevents flow of the plug body material past the compression plate. Integrally formed with the stem are a pair of oppositely extending detents which engage in slots provided in the plug body to prevent rotation of the plug body on the stem.

Other objects and advantages of the present invention will become apparent from the following specification when considered in light of the attached drawings.

BRIEF DESCRIPTION OF THE DRAWINGS

FIG. 1 is a side elevation of the invention shown in place in a thimble of a boat transom shown partially broken away and in section for convenience of illustration;

FIG. 2 is an inner end elevation of the invention;

FIG. 3 is a transverse sectional view taken on the line 3—3 of FIG. 1, looking in the direction of the arrows;

FIG. 4 is an enlarged longitudinal sectional view taken along the line 4—4 of FIG. 1, looking in the direction of the arrows;

FIG. 5 is a transverse sectional view taken along the line 5—5 of FIG. 4, looking in the direction of the arrows; and FIG. 6 is a side elevation of a slightly modified form of the invention shown partially broken away and in section for convenience of illustration.

DESCRIPTION OF THE PREFERRED EMBODIMENT

Referring now to the drawings in detail and in particular to FIGS. 1 through 5 thereof, the reference numeral 10 indicates generally a marine bailer plug constructed in accordance with the invention.

The marine bailer plug 10 is adapted for use in a metallic thimble 11 projecting through the transom 12 of a boat 13. The thimble 11 is flanged at 14 at its inner end and at 15 at its outer end to secure the thimble 11 in the transom 12. The construction of the boat 13, transom 12 and thimble 11 is completely conventional.

The bailer plug 10 includes an elongate stem 16 having a head 17 integrally formed on its outer end. The head 17 has a diameter slightly less than the internal diameter of the thimble 11 to permit access of the head 17 into the thimble 11. The stem 16 has its end opposite the head 17 threaded at 18 for reasons to be assigned. A pair of detents 19 extend radially outwardly from the stem 16 and are integrally formed with the stem and the head 17, as can be clearly seen in FIG. 4.

A generally cylindrical resilient compressible plug body 20 is provided with an axial bore 21 through which the stem 16 projects. Slots 22 on opposite sides of the bore 21 at one end of the body 20 are adapted to receive the detents 19 therein to prevent relative rotation between the stem 16 and the body 20.

The outer surface of the body 20 is provided with a plurality of annular ribs 23 separated by a plurality of annular grooves 24. The head 17 on the stem 16 has an outwardly flaring annular portion 25 terminating in a flat disk-like portion 26. The end of the body 20 adjacent the head 17 engages the inner end of the flared portion 25 normally so that the initial compression of the body 20 will cause the plug material to bulge radially outwardly adjacent the head 17 to produce a seal against the thimble 11. The pressure of the body 20 against the head 17 also seals the bore 21 in the body 20 and eliminates the necessity for an O-ring commonly used in the prior art. The inital bulging of the body 20 combined with a minimal clearance between the head 17 and the inner diameter of the thimble 11 prevent the body 20 from flowing past the head 17.

A generally circular plate 27 has an axial bore 28 which engages over the threaded stem 16 at the end of the body 20 opposite the head 17. The circular plate 27 has an annular flat central portion 29 and an annular flat outer portion 30 connected by an outwardly flaring annular portion 31. The annular flat central portion 29 engages tightly against the end of the body 20 opposite the head 17 and the outer flat annular portion 30 provides a metal to metal contact with the inner flange 14 or outer flange 15 of the thimble 17 and thus prevents flow of the body 20 thereby.

The flared portion 31 of the plate 27 offsets the plug body 20 inwardly of the thimble 11 to provide a good seal. A flat washer 32 is engaged over the threaded stem 16 and engages against the central flat portion 29 of the plate 27. A generally cylindrical nut 33 is threaded onto the threaded stem 16 and has a hollow tubular shaft 34 integrally formed therewith and extending outwardly therefrom. The threaded stem 16 has its outer end upset at 35 to prevent the nut 33 from disengaging therefrom. A T-bar 36, having a serrated central portion 37, is pressed through bores 38 in the tubular shaft 34. The T-bar 36 extends radially outwardly on each side of the tubular shaft 34 to provide a hand grip for rotating the nut 33. A disk 39 is engaged in the outer end of the tubular shaft 34, as can be seen in FIG. 4.

The hollow shaft 34 is filled with grease G prior to inserting the disk 39. The disk 39 prevents dirt and grit from reaching the grease G. The grease G lubricates the nut 33 and the threaded stem 18.

A washer 40 is loosely engaged over the tubular shaft 34 and has a securing chain 41 attached thereto. The opposite end of the securing chain 41 is attached at any desired point in the boat 13.

In the use and operation of the invention, illustrated in FIGS. 1 through 5, the nut 33 is first loosened on the threaded stem 16 to permit the plug body 20 to be inserted into the thimble 11. With the outer portion 30 of the plate 27 in engagement with the flange 14, the threaded nut 33 is tightened on the threaded stem 16 by rotating the T-bar 36 by hand. As the threaded nut 33 tightens on the threaded stem 16, the plate 27 is moved toward the head 17, compressing the plug body 20 so that it seals against the inner faces of the head 17 and plate 29, against the stem 16, and against the inner surface of the thimble 11. As explained above, overturning of nut 33 will not result in flowing of plug body 22 past the head 17 or plate 27. By reversing the direction of rotation of the T-bar 36, the nut 33 can be loosened to permit the bailer plug 10 to be removed from the thimble 11 when bailing is necessary.

The bailer plug 10 is intended for use at the interior of the transom 12 and, hence, its chain 41 is secured to the tubular shaft 34. In FIG. 6, a slightly modified form of the invention is disclosed and indicated generally at 50 with its intended insertion being from the outside of the transom 12, necessitating that the retainer chain have a different point of connection. In the bailer plug 50, the washer 40 and chain 41 are omitted and a retainer chain 51 is secured to the head 17 by means of a rivet 52. Other than the retainer chain 51 and its method of attachment to the plug 50, the bailer plug 50 is identical in all other respects to the bailer plug 10.

Having thus described the preferred embodiments of the invention, it should be understood that numerous structural modifications and adaptations may be resorted to without departing from the spirit of the invention.

What is claimed is:

1. A marine bailer plug for insertion in a boat drain thimble comprising in combination a resilient generally cylindrical compressible plug body having opposed ends extending perpendicularly to the axis and an axial bore extending therethrough, a stem extending completely through said bore and beyond said ends including a head integral with one end of said stem, said head including a conical portion flared outwardly adjacent one end of said body beginning inwardly of said axial bore and terminating inwardly of the periphery of said head, and an annular flat portion extending outwardly from said conical portion parallel to said one end of said body, said head having a size slightly less than the inner diameter of said thimble, a compression plate on said stem at the other end of said body, said compression plate having an inner flat portion engaging said other end of said body, an outwardly flared portion on said inner portion extending away from said body and a flat outer portion parallel with said other end, said compression plate has a size greater than the diameter of said thimble with said flat outer portion of said compression plate adapted for engagement with one end of said thimble, cooperating means on said stem and said body for preventing relative rotation between said stem and body, and means on said stem for moving said compression plate toward said head to compress said body therebetween and expand said body into sealing engagement with said thimble with all of said body retained between said head and said compression plate.

2. A device as claimed in claim 1 whrein the means on said stem comprises threads on said stem, a Nut on said stem, and a hollow tubular shaft integrally formed on said nut and extending beyond the end of said stem.

3. A device as claimed in claim 2 including means in said tubular shaft for lubricating the threads of said stem and nut.

4. A device as claimed in claim 1 wherein said cooperating means comprises at least one detent on said stem extending substantially radially outwardly and at least one detent receiving slot in said one end of said body communicating with the bore in said body.

5. A device as claimed in claim 4 wherein said detent comprises a plate extending along said stem substantially parallel with the axis of said stem.

6. A device as claimed in claim 4 including a pair of detents extending from opposite sides of said stem.

* * * * *